April 1, 1947. L. A. McNABB 2,418,361
MOTION PICTURE MACHINE
Filed Feb. 28, 1945
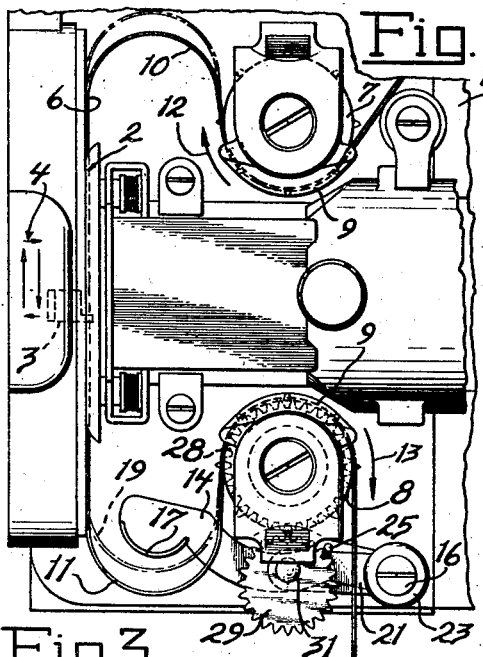
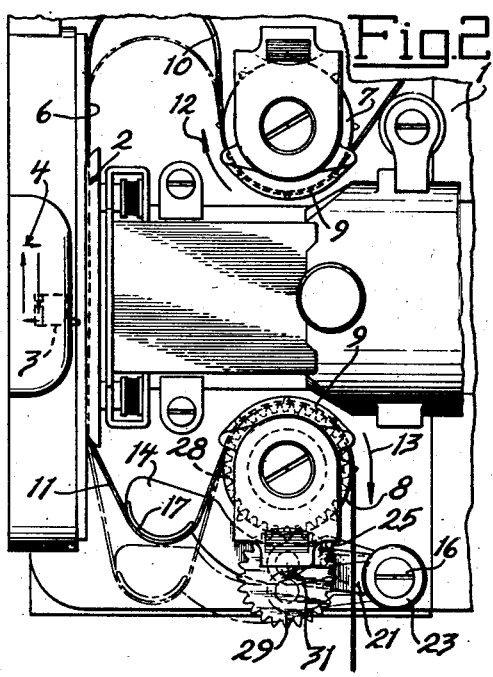
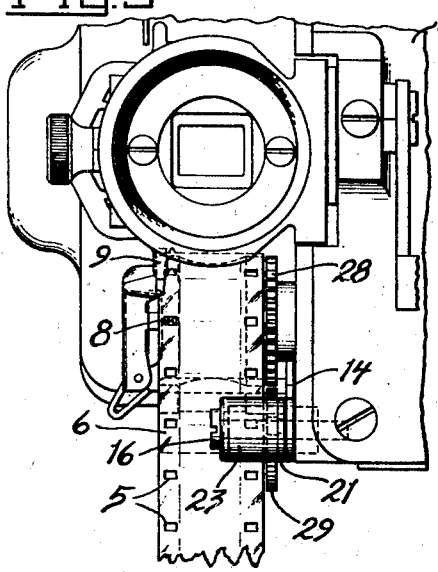
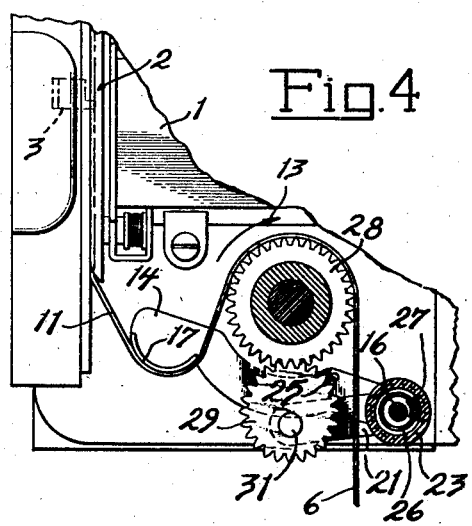
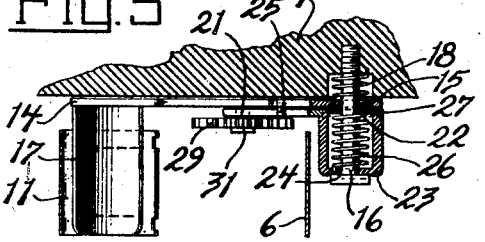
INVENTOR
LOUIS A. McNABB
BY Robert F. Miehle, Jr.
ATTY.

Patented Apr. 1, 1947

2,418,361

UNITED STATES PATENT OFFICE 2,418,361

MOTION-PICTURE MACHINE

Louis A. McNabb, Glenview, Ill., assignor to The Bell & Howell Company, Chicago, Ill., a corporation of Illinois Application February 28, 1945, Serial No. 580,105

10 Claims. (Cl. 88—18.4)

In a motion picture machine, such as a motion picture projecting machine, embodying an intermittent film feeding device and a rotatable constant film feeding take-up sprocket both operative on feed perforations of a film strip and the sprocket serving to take up the film strip from the intermittent feeding device through a compensating loop of the film strip, the intermittent feeding device will on occasion fail to intermittently feed the film strip, this failure occurring when the film strip is mutilated or has inaccurately spaced feed perforations. When such failure occurs, the take-up sprocket continues to take up the film strip from the intermittent feeding device, which abnormally shortens the compensating loop of the film strip between the take-up sprocket and the intermittent feeding device and causes improper operation and often damage to the film strip.

Objects of my invention reside in the provision, in a motion picture machine of the above type, of a novel, simple and effective mechanism which will automatically restore the compensating loop, between the intermittent film feeding device and the constant film feeding take-up sprocket, to normal condition upon abnormal contraction of the compensating loop, which is adapted for existing types of motion picture machines, and which is not liable to cause damage to the film strip.

The invention will be better understood by reference to the accompanying drawing forming a part hereof and in which—

Figures 1 and 2 are partial side elevations of a motion picture projecting machine embodying my invention and showing parts of the mechanism in different positions;

Figure 3 is a partial front elevation of the same and showing parts of the mechanism in the same position in which they are shown in Figure 1;

Figure 4 is a partial side elevation similar to Figures 1 and 2 with parts omitted and parts shown in section and showing parts in different positions than those in which they are shown in Figures 1 or 2; and Figure 5 is a horizontal sectional view of a portion of the mechanism.

Referring to the drawing, 1 designates a frame, and carried on the frame is an intermittent film feeding device of the toothed shuttle type which, as shown, is inclusive of a vertically disposed film feed guide, generally designated at 2, and a toothed film feeding shuttle 3 actuated by usual mechanism, not shown, in a rectangular path as indicated by the rectangularly arranged arrows designated at 4. See Figures 1 and 2. As the shuttle is so actuated it sequentially engages usual feed perforations 5, as shown in Figure 3, of a motion picture film strip 6 in the guide to intermittently feed the film.

Two vertically spaced rotatable constant film feed sprockets 7 and 8 are carried on the frame 1, and the film strip 6 is oppositely trained thereover with the teeth of the sprockets engaged with feed perforations of the film strip, releasable retaining devices, generally designatel at 9, serving to retain the film strip in engagement with the sprockets. The sprockets are constantly driven in timed relation with actuation of the shuttle 3 in a usual manner, not shown, and serve to constantly feed the film to and from opposite ends of the guide 2 through compensating loops 10 and 11 of the film strip and to constantly feed the film strip from and to feed and take-up reels, not shown.

In the normal direction of feed of the film strip downwardly through the guide 2, the upper sprocket 7 rotates clockwise as indicated by the arrow 12 and feeds the film strip to the upper end of the guide through the loop 10 and the lower sprocket 8 also rotates clockwise as indicated by the arrow 13 and takes up the film strip from the lower end of the guide through the loop 11, both loops contracting and expanding to a normal extent to compensate for the intermittent and constant feed of the film strip.

A loop expanding arm 14 has its main portion disposed at one side of the path of the film strip and adjacent the frame 1 and has one end pivotally mounted, as designated at 15 in Figure 5, on a stud 16 secured on the frame 1 and disposed in adjacent parallelism with the axis of the lower sprocket 8, the expanding arm 14 being thus pivotally mounted on an axis parallel to that of the sprocket 8. The expanding arm 14 extends generally horizontally below the sprocket 8, and its other end is provided with a laterally extending film strip loop engaging portion 17 which is reciprocable and operative interiorly of the loop 11 to expand the same with downward movement of the arm.

A torsion spring 18 encircles the stud 16 and has its ends respectively secured with the frame 1 and the expanding arm 14 as shown in Figure 5, and this spring yieldably urges and normally maintains the arm 14 in a position intermediate its movement and in spaced and non-interfering relation with normal contraction of the loop 11, see Figure 1 in which the normal contraction of this loop is indicated at 19.

Another arm 21 has one end pivotally mounted, as designated at 22 in Figure 5, on the stud 16 on an axis parallel to that of the lower sprocket 8, and extends generally horizontally below the sprocket 8. A bored hub member 23 is secured on the arm 21 concentrically of the pivotal axis of this arm and is also pivotally mounted on the stud 16, as designated at 24, thus extending the pivotal mounting of the arm 21. An abutment stud 25 is mounted on the expanding arm 14 and overlies the arm 21 to provide abutment means operative between the arm 14 and 21 to actuate the arm 21 downwardly with movement of the arm 14 downwardly in the loop expanding direction. Another torsion spring 26 is arranged within the bore of the hub 23 and encircles the stud 16 and has its ends respectively secured with the arm 14 and the hub 23 and is thus operative between the arms 14 and 21 in opposition to the abutment means provided by the stud 25, the spring 26 extending through a slot 27, see Figure 4, through the arm 21 and arranged angularly of the pivotal axis of this arm to permit relative pivotal movement of the arms 14 and 21. The spring 26 is under initial tension and is of greater effective power than the spring 18 so that movement of the arm 21 downwardly in the loop expanding direction yieldably actuates the arm 14 downwardly in the loop expanding direction.

A rotatable circular driving member comprising a spur gear 28 is secured with the sprocket 8 in concentric relation therewith and is thus rotated therewith, and a rotatable driven member comprising a radial cam, in the form of a spur gear 29 mounted for eccentric rotation and adapted to mesh with the gear 28, is disposed for circumferential camming engagement with the driving gear 28 and is rotatably mounted on the other end of the arm 21, as designated at 31, below the driving gear 28 on an axis parallel to that of the sprocket 8. As so mounted on the arm 21, the gear 29 is reciprocable in a path having normal relation with the portion of this gear opposing the gear 28 to engage with and disengage from the gear 28, the teeth of these gears being pointed as shown to promote engagement thereof.

As aforesaid, the spring 18 yieldably urges and normally maintains the loop expanding arm 14 in a position intermediate its movement and in non-interfering relation with normal contraction of the loop 11, and this spring, through the medium of the spring 26 maintaining the arm 21 in abutting relation with the abutment stud 25, also yieldably urges and normally maintains the arm 21 in a position intermediate its movement, as shown in Figure 1. The cam or eccentric gear 29 is normally positioned, by reason of the unbalanced weight thereof with the low or minor radius portion thereof opposing the driving gear 28, and in the said normal position of the arm 21 the eccentric gear 29 is disengaged from the driving gear 28 as shown in Figures 1 and 3. These normal positions and relations of the arms 14 and 21 and of the eccentric gear 29 are maintained during normal contraction and expansion of the loop 11 incident to the feeding of the film strip.

However, when the loop 11 abnormally contracts, as shown in full lines in Figure 2, by the failure of the intermittent feeding mechanism to intermittently feed the film strip, this loop engages the loop engaging portion 17 of the arm 14 and the abnormal contraction of the loop actuates the arm 14 out of its normal position in the loop contracting direction into the position shown in full lines in Figure 2. By reason of the spring 26 maintaining the arm 21 in abutting relation with the abutment stud 25, the arm 21 and the eccentric gear 29 are actuated with the arm 14 in the loop contracting direction and this causes the low or minor radius portion of the cam or eccentric gear 29 to mesh with the driving gear 28 as also shown in full lines in Figure 2.

When the eccentric gear 29 meshes with the gear 28, it is rotated thereby and cams on the gear 28 and thus effects actuation of the arm 21 and of the arm 14, through the medium of the spring 26 overpowering the spring 18, in the loop expanding direction past the normal positions thereof and consequently effects restoration of the loop 11 to normal condition, as shown in dot-and-dash lines in Figure 2, and thereafter effects, in cooperation with the spring 18, a return of the arms 21 and 14 and the eccentric gear 29 to their normal positions, the loop being restored to normal condition by the expanding arm 14 drawing the required amount of the film strip from the feed guide 2.

Where, as shown, the intermittent feeding mechanism embodies a toothed intermittent feeding member, such as the shuttle 3, which is operative on the feed perforations of the film strip in both directions lineally of the film strip, the expanding arm 14 must draw the film strip from the guide 2 while the toothed intermittent feeding member is disengaged from any of the feed perforations of the film strip.

When it happens that the arm 21 is actuated in the loop expanding direction while the toothed intermittent feeding member or shuttle is engaged with any feed perforation of the film strip, as shown in Figure 4, the spring 26, which is operative between the arms 14 and 21 to actuate the arm 14 in the loop expanding direction with corresponding actuation of the arm 21, yields and thus permits the loop 11 to retard movement of the arm 14 in the loop expanding direction until the toothed intermittent feeding member disengages any feed perforation of the film strip. Accordingly, damage to the film strip is prevented. If the loop 11 is not restored to normal condition with the first revolution of the eccentric gear 29, the loop restoring cycle is repeated until the loop is restored to normal condition.

While I have thus described my invention, I do not wish to be limited to the precise details described, as changes may be readily made without departing from the spirit of my invention, but having thus described my invention, I claim as new and desire to secure by Letters Patent the following:

1. In a motion picture machine, the combination with an intermittent film feeding device and a rotatable constant film feeding sprocket operative on feed perforations of a film strip and said sprocket being operative to take up the strip from said intermittent feeding device through a compensating loop of the strip, of a reciprocable loop expanding member operative interiorly of said loop to expand the same and normally positioned in non-interfering relation with normal contraction of said loop, and actuating means operative, responsive to abnormal contraction of said loop, to reciprocate said expanding member to restore said loop to normal condition and comprising rotatable driving and driven members of surface of revolution character and of which the driving member is connected for rotation with said sprocket and of which the driven member comprises a cam disposed for driven camming engagement with said driving member and bodily reciprocable in a path having normal relation with the portion thereof opposing said driving member and operatively connected with said expanding member for reciprocation therewith.

2. In a motion picture machine, the combination with an intermittent film feeding device and a rotatable constant film feeding sprocket both operative on feed perforations of a filmstrip and said sprocket being operative to take up the strip from said intermittent feed device through a compensating loop of the strip, of a reciprocable loop expanding member operative interiorly of said loop to expand the same and normally positioned intermediately of its movement in non-interfering relation with normal contraction of said loop and from which position said expanding member is actuated by abnormal contraction of said loop, and actuating means operative, responsive to actuation of said expanding member by abnormal contraction of said loop, to reciprocate said expanding member to restore said loop to normal position and comprising rotatable driving and driven members of surface of revolution character and of which the driving member is connected for rotation with said sprocket and of which the driven member comprises a cam disposed for driven camming engagement with said driving member and bodily reciprocable in a path having normal relation with the portion thereof opposing said driving member and operatively connected with said expanding member for reciprocation therewith.

3. In a motion picture machine, the combination with an intermittent film feeding device and a rotatable constant film feeding sprocket both operative on feed perforations of a film strip and said sprocket being operative to take up the strip from said intermittent feeding device through a compensating loop of the strip, of a reciprocable loop expanding member operative interiorly of said loop to expand the same and yieldably urged and normally maintained in a position intermediate its movement and in non-interfering relation with normal contraction of said loop, rotatable driving and driven members of surface of revolution character of which the driving member is connected for rotation with said sprocket and of which the driven member comprises a cam disposed for driven camming engagement with said driving member and bodily reciprocable in a path having normal relation with the portion thereof opposing said driving member and operatively connected with said expanding member for movement of said cam in the driving member engaging and disengaging directions with movement of said expanding member respectively in the loop contracting and expanding directions, said cam being normally positioned with the low portion thereof opposing said driving member and disengaged therefrom when said expanding member is in its said normal position, and said cam being engageable with said driving member for rotation thereby upon actuation of said expanding member from its said normal position by abnormal contraction of said loop and being operative upon such rotation to actuate said expanding member to restore said loop to normal condition.

4. In a motion picture machine, the combination with an intermittent film feeding device and a rotatable constant film feeding sprocket both operative on feed perforations of a film strip and said sprocket being operative to take up the strip from said intermittent feeding device through a compensating loop of the strip, of a reciprocable loop expanding member operative interiorly of said loop to expand the same, spring means yieldably urging and normally maintaining said expanding member in a position intermediate its movement and in non-interfering relation with normal contraction of said loop, rotatable driving and driven members of surface of revolution character of which the driving member is connected for rotation with said sprocket and of which the driven member comprises a cam disposed for driven camming engagement with said driving member and bodily reciprocable in a path having normal relation with the portion thereof opposing said driving member, abutment means operative between said cam and expanding member and operative to actuate said cam in the driving member disengaging direction with actuation of said expanding member in the loop expanding direction, a second spring means operative between said cam and expanding member in opposition to said abutment means and having greater effective power than said first mentioned spring means, said cam being normally positioned with the low portion thereof opposing said driving member and disengaged therefrom when said expanding member is in its said normal position, and said cam being engageable with said driving member for rotation thereby upon actuation of said expanding member from its said normal position by abnormal contraction of said loop and being operative upon such rotation to actuate said expanding member to restore said loop to normal condition.

5. In a motion picture machine, the combination with an intermittent film feeding device and a rotatable constant film feeding sprocket both operative on feed perforations of a film strip and said sprocket being operative to take up the strip from said intermittent feeding device through a compensating loop of the strip, of a loop expanding arm pivotally mounted at one end on an axis parallel to that of said sprocket and having its other end reciprocable interiorly of said loop and operative to expand the same, spring means yieldably urging and normally maintaining said expanding arm in a position intermediate its movement and in non-interfering relation with normal contraction of said loop, a second arm pivotally mounted at one end on an axis parallel to that of said sprocket, rotatable driving and driven members of which the driving member is circular and is fixed with said sprocket for concentric rotation therewith and of which the driven member comprises a radial cam disposed for driven camming engagement with said driving member and rotatably mounted on the other end of said second arm on an axis parallel to that of said sprocket and reciprocable with said second arm in a path having normal relation with the portion of said cam opposing said driving member, abutment means operative between said arms and operative to actuate said cam in the driving member disengaging direction with actuation of said expanding arm in the loop expanding direction, a second spring means operative between said arms in opposition to said abutment means and having greater effective power than said first mentioned spring means, said cam being normally positioned with the minor radius portion thereof opposing said driving member and disengaged therefrom when said expanding member is in its said normal position, and said cam being engageable with said driving member for rotation thereby upon actuation of said expanding member from its said normal position by abnormal contraction of said loop and being operative upon such rotation to actuate said expanding member to restore said loop to normal condition.

6. In a motion picture machine, the combination with an intermittent film feeding device and a rotatable constant film feeding sprocket both operative on feed perforations of a film strip and said sprocket being operative to take up the strip from said intermittent feeding device through a compensating loop of the strip, of a reciprocable loop expanding member operative interiorly of said loop to expand the same and normally positioned in non-interfering relation with normal contraction of said loop, and actuating means operative, responsive to abnormal contraction of said loop, to reciprocate said expanding member to restore said loop to normal condition and comprising rotatable driving and driven members of surface of revolution character and of which the driving member comprises a gear and is connected for rotation with said sprocket and of which the driven member comprises a cam in the form of a gear disposed for driven camming mesh with said driving member and bodily reciprocable in a path having normal relation with the portion thereof opposing said driving member and operatively connected with said expanding member for reciprocation therewith.

7. In a motion picture machine, the combination with an intermittent film feeding device and a rotatable constant film feeding sprocket both operative on feed perforations of a film strip and said sprocket being operative to take up the strip from said intermittent feed device through a compensating loop of the strip, of a reciprocable loop expanding member operative interiorly of said loop to expand the same and normally positioned intermediately of its movement in non-interfering relation with normal contraction of said loop and from which position said expanding member is actuated by abnormal contraction of said loop, and actuating means, operative responsive to actuation of said expanding member by abnormal contraction of said loop, to reciprocate said expanding member to restore said loop to normal condition and comprising rotatable driving and driven members of surface of revolution character and of which the driving member comprises a gear and is connected for rotation with said sprocket and of which the driven member comprises a cam in the form of a gear disposed for camming mesh with said driving member and bodily reciprocable in a path having normal relation with the portion thereof opposing said driving member and operatively connected with said expanding member for reciprocation therewith.

8. In a motion picture machine, the combination recited in claim 3 and further characterized in that said driving member comprises a gear and said cam is in the form of a gear adapted to mesh with said driving member.

9. In a motion picture machine, the combination recited in claim 4 and further characterized in that said driving member comprises a gear and said cam is in the form of a gear adapted to mesh with said driving member.

10. In a motion picture machine, the combination recited in claim 5 and further characterized in that said driving member comprises a spur gear and said cam is in the form of a spur gear adapted to mesh with said driving member.

LOUIS A. McNABB.

REFERENCES CITED

The following references are of record in the file of this patent:

UNITED STATES PATENTS

| Number | Name | Date |
|---|---|---|
| 2,172,235 | Aldinger | Sept. 5, 1939 |
| 2,332,079 | Hoehn | Oct. 19, 1943 |

FOREIGN PATENTS

| Number | Country | Date |
|---|---|---|
| 568,603 | German | Jan. 21, 1933 |
| 568,726 | German | Jan. 23, 1933 |